(12) United States Patent
Chen

(10) Patent No.: US 8,939,871 B2
(45) Date of Patent: Jan. 27, 2015

(54) ACCELERATION MECHANISM FOR EXERCISE EQUIPMENT

(75) Inventor: Yi-Lun Chen, New Taipei (TW)

(73) Assignee: Bion, Inc., New Taipei (TW)

( * ) Notice: Subject to any disclaimer, the term of this patent is extended or adjusted under 35 U.S.C. 154(b) by 401 days.

(21) Appl. No.: 13/400,760

(22) Filed: Feb. 21, 2012

(65) Prior Publication Data

US 2012/0217758 A1 Aug. 30, 2012

(30) Foreign Application Priority Data

Feb. 24, 2011 (TW) .............................. 100106292 A
Feb. 24, 2011 (TW) .............................. 100203352 U
Apr. 1, 2011 (TW) .............................. 100205806 U

(51) Int. Cl.
| | |
|---|---|
| A63B 22/06 | (2006.01) |
| A63B 21/00 | (2006.01) |
| F03G 5/06 | (2006.01) |
| A63B 21/005 | (2006.01) |
| A63B 21/22 | (2006.01) |
| A63B 69/16 | (2006.01) |

(52) U.S. Cl.
CPC . *A63B 21/15* (2013.01); *F03G 5/06* (2013.01); *A63B 21/0053* (2013.01); *A63B 21/225* (2013.01); *A63B 22/0605* (2013.01); *A63B 2021/0054* (2013.01); *A63B 2021/0055* (2013.01); *A63B 2069/168* (2013.01); *A63B 2220/76* (2013.01)
USPC .............................................. 482/63; 482/57

(58) Field of Classification Search
CPC ........... A63B 21/0053; A63B 22/0605; A63B 2021/0055
USPC .............................................. 482/1–9, 57–65
See application file for complete search history.

(56) References Cited

U.S. PATENT DOCUMENTS

| | | | | |
|---|---|---|---|---|
| 3,589,193 | A * | 6/1971 | Thornton | 482/2 |
| 4,358,105 | A * | 11/1982 | Sweeney, Jr. | 482/5 |
| 4,678,182 | A * | 7/1987 | Nakao et al. | 482/9 |
| 4,775,145 | A * | 10/1988 | Tsuyama | 482/63 |
| 4,817,938 | A * | 4/1989 | Nakao et al. | 482/4 |
| 4,941,652 | A * | 7/1990 | Nagano et al. | 482/73 |
| 5,027,303 | A * | 6/1991 | Witte | 702/44 |
| 5,067,710 | A * | 11/1991 | Watterson et al. | 482/3 |
| 5,324,242 | A * | 6/1994 | Lo | 482/63 |
| 5,947,869 | A * | 9/1999 | Shea | 482/8 |
| 6,084,325 | A * | 7/2000 | Hsu | 310/74 |
| 6,171,218 | B1 * | 1/2001 | Shea | 482/57 |
| 6,234,939 | B1 * | 5/2001 | Moser et al. | 482/63 |
| 7,018,324 | B1 * | 3/2006 | Lin | 482/63 |
| 7,090,620 | B1 * | 8/2006 | Barlow | 482/63 |
| 7,481,749 | B1 * | 1/2009 | Chen | 482/64 |
| 7,704,190 | B2 * | 4/2010 | Lin et al. | 482/2 |
| 7,740,565 | B2 * | 6/2010 | Chen | 482/63 |
| 7,976,434 | B2 * | 7/2011 | Radow et al. | 482/8 |

(Continued)

*Primary Examiner* — Stephen Crow
(74) *Attorney, Agent, or Firm* — Rosenberg, Klein & Lee

(57) ABSTRACT

A rotary disk acceleration mechanism for exercise equipment includes a stationary axle; a first large rotary disk; at least one acceleration disk assembly; a first belt, which is coupled between the acceleration disk assembly and the first large rotary disk; a first bearing, which is mounted to the stationary axle; a second small rotary disk, which is rotatably mounted by the first bearing to the stationary axle and is coaxial with the first large rotary disk; and a second belt, which is coupled between the acceleration disk assembly and the second small rotary disk, so that the acceleration disk assembly drives, via the second belt, the second small rotary disk to rotate.

7 Claims, 9 Drawing Sheets

(56) References Cited

U.S. PATENT DOCUMENTS

| | | | |
|---|---|---|---|
| 8,162,803 B2 * | 4/2012 | Schroeder et al. | 482/5 |
| 8,328,692 B2 * | 12/2012 | Lin | 482/2 |
| 2007/0232465 A1 * | 10/2007 | Puzey | 482/110 |
| 2007/0259756 A1 * | 11/2007 | Kuykendall | 482/2 |
| 2013/0274064 A1 * | 10/2013 | Liang | 482/2 |
| 2014/0045657 A1 * | 2/2014 | Pedrini | 482/61 |

* cited by examiner

ACCELERATION MECHANISM FOR EXERCISE EQUIPMENT

BACKGROUND OF THE INVENTION

1. Field of the Invention

The present invention relates to a rotary disk acceleration mechanism, and in particular to a rotary disk acceleration mechanism for exercise equipment.

2. The Related Arts

Population is gradually concentrated in large cities and under such a condition that a great population resides in a limited area, it becomes very extravagant to provide a large amount of space for doing exercise. Even in a public place, doing exercise may only be achieved by spending money and time. Due to such reasons, various forms of indoor exercise equipment are available in the market and one the most commonly used is a stationary bike.

The known stationary bike has been developed for years. Instead of the simple function of being used as a substitute for exercise space, the consumers now ask for an upgraded function of adjustability of training weight for the stationary bikes.

The measure that an early stationary bike adopts to adjust the training weight is to adjust the weight of a flywheel. This is troublesome for users. A subsequent improvement in this respect is increasing the resistance of the flywheel by which the energy required to achieve the same rotational speed of the flywheel is raised, whereby a user must spends more physical strength to make the flywheel rotating at the same speed and the weight of training is thus enhanced.

In an early time, the measure of increasing resistance of flywheel was done by adjusting the spring force of a spring and the spring biased a brake shoe to abut against the flywheel. This is effective in reducing the speed of the flywheel or in other words increasing the resistance of the flywheel, but the brake shoe is gradually worn out. Further, for a long time use, the brake shoe generates high temperature and thus releases odors, as well as noises.

The most commonly used measure of adjusting flywheel resistance is to generate electromagnetic resistance induced by power generation coupled thereto. Such a structure requires mounting a power generation system to the stationary bike for the generation of electrical power.

A conventional power generation system used in the stationary bike comprises a plurality of permanent magnets mounted to an inner circumferential surface of a flywheel of the bike and a coil core that is formed by stacking a plurality of silicon steel plates set at a location corresponding to the permanent magnets and comprising a plurality of coils of wire each corresponding to the magnets with a predetermined gap present therebetween. Such a conventional structure has drawbacks including: large volume, small amount of power generated in low rotational speed, great waste of material cost, high temperature in operation, being hard to assemble, and high human labor cost.

Another known power generation system used in a stationary bike comprises a structure that include a planetary gear mounted to an inner circumferential surface of a flywheel of the stationary bike, whereby power generation can be realized through mating engagement among a plurality of gears. Such a conventional structure has disadvantages, which include: requiring a complicated gear based structure that is composed of various gears and toothed wheels, high material costs, great noise generated in the operation of the gears, being hard to assemble, high human labor cost, speed magnification being limited by the structure.

In another known power generation system used in a stationary bike, ring magnets are mounted around the shaft of a flywheel of the stationary bike and a coil core that is composed of stacked silicon steel plates is provided at a location facing the ring magnets. A plurality of wire coils is wound around the coil core with each coil facing and spaced from the magnets by a predetermined gap. Such a conventional structure is advantageous for being of a small size, but it also has disadvantages including: small amount of power generated in low rotational speed, great waste of material cost, being hard to assemble, and high human labor cost.

In another known power generation system used in a stationary bike, a power generation module is provided adjacent to a flywheel of the stationary bike. The power generation module has a rotor that is coupled by a belt to an outer circumferential surface of the flywheel of the stationary bike. When the flywheel rotates, the belt drives the power generation module to generate electrical power. Such a conventional shows certain drawbacks, including: requiring an externally mounted power generation module, being hard to assemble, high material costs, high human labor cost, and difficult maintenance.

All these various known techniques are effective in generating electricity, inducing a brake power, and achieving the purpose of doing exercise, but they are complicated structures and the sizes are generally bulky, making it impossible to effectively make use of a limited amount of space.

SUMMARY OF THE INVENTION

Thus, an object of the present invention is to provide a rotary disk acceleration device, which comprises an input shaft that is provided for supplying an external driving force and an output shaft for acceleration, which are arranged in a coaxial structure.

Another object of the present invention is to provide a rotary disk acceleration device that integrates various component of the rotary disk acceleration device in a limited amount of space to thereby realize a small size.

A further object of the present invention is to mount a rotary disk acceleration device to a flywheel structure of stationary bike, whereby through a high speed rotation generated by the rotary disk acceleration device, a power generation module generates an increased amount of electrical power supplied to the stationary bike.

The solution adopted in the present invention to address the technical issues comprises a stationary axle; a first large rotary disk, which is rotatably mounted to the stationary axle and is adapted to be driven by an external driving force to rotate; at least one acceleration disk assembly; a first belt, which is coupled between the acceleration disk assembly and the first large rotary disk, so that the first large rotary disk drives, via the first belt, the acceleration disk assembly to rotate; a first bearing, which is mounted to the stationary axle; a second small rotary disk, which is rotatably mounted by the first bearing to the stationary axle and is coaxial with the first large rotary disk; and a second belt, which is coupled between the acceleration disk assembly and the second small rotary disk, so that the acceleration disk assembly drives, via the second belt, the second small rotary disk to rotate.

In a preferred embodiment of the present invention, the acceleration disk assembly comprises a first secondary shaft, which is mounted at a position close to the stationary axle and is spaced from the stationary axle by a predetermined distance; a first small rotary disk, which is rotatably mounted to the first secondary shaft; and a second large rotary disk, which is rotatably mounted to the first secondary shaft and is fixedly attached to the first small rotary disk to be rotatable in unison with the first small rotary disk.

The rotary disk acceleration device for exercise equipment provided by the present invention shows the following advantages:

(1) It has a design that breaks all the conventional designs;
(2) A user may get a high speed rotation al output at the same input rotational speed;
(3) When the high speed output so generated is applied to drive a rotor of a power generation system, an increased amount of power can be generated by the power generation system;
(4) The material cost is low and the trend of environmental conservation is met;
(5) The quality of power generation is stable;
(6) The human labor for assembling is low;
(7) The amount of electrical power generated can be adjusted or amplified by adjusting the ratio between the sizes of rotary disks;
(8) Low noise is generated during high speed rotation; and
(9) The acceleration mechanism may be coupled with a brake device. The brake device may be rotated in a high speed, so that the brake device may generate large braking power with reduced overall volume and weight.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
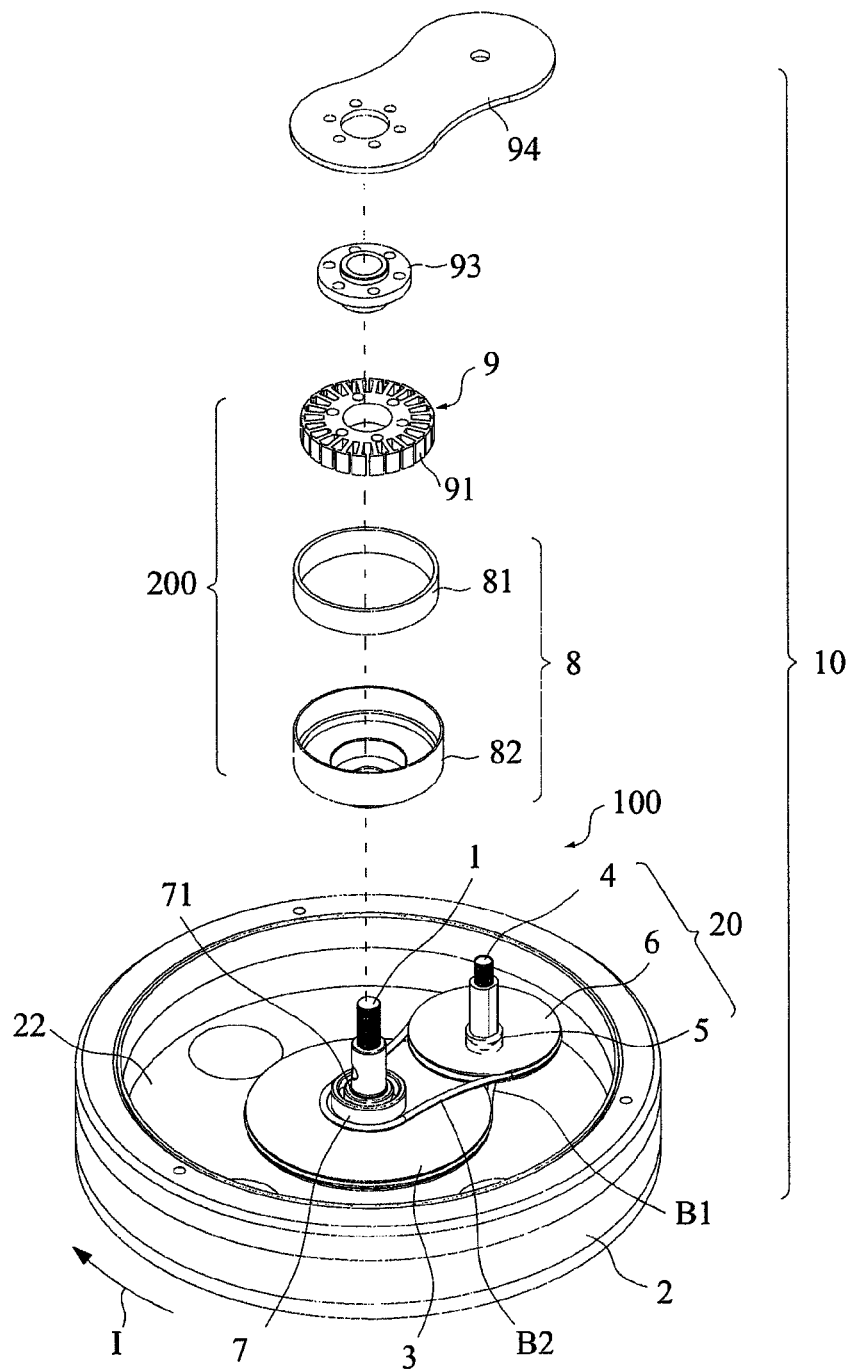
FIG. 1 is an exploded view showing a first embodiment of the present invention.
Figure 2:
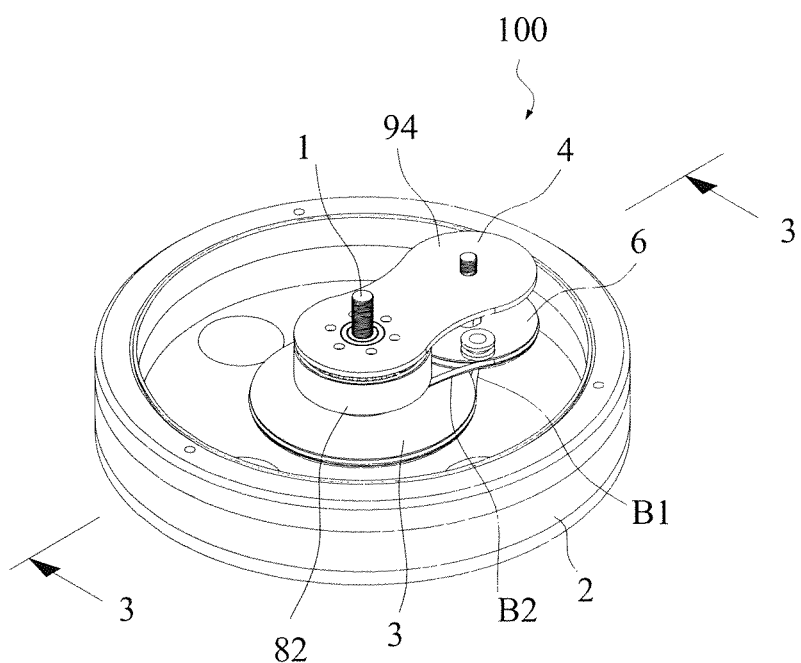
FIG. 2 is a perspective view showing the first embodiment of the present invention in an assembled form.
Figure 3:
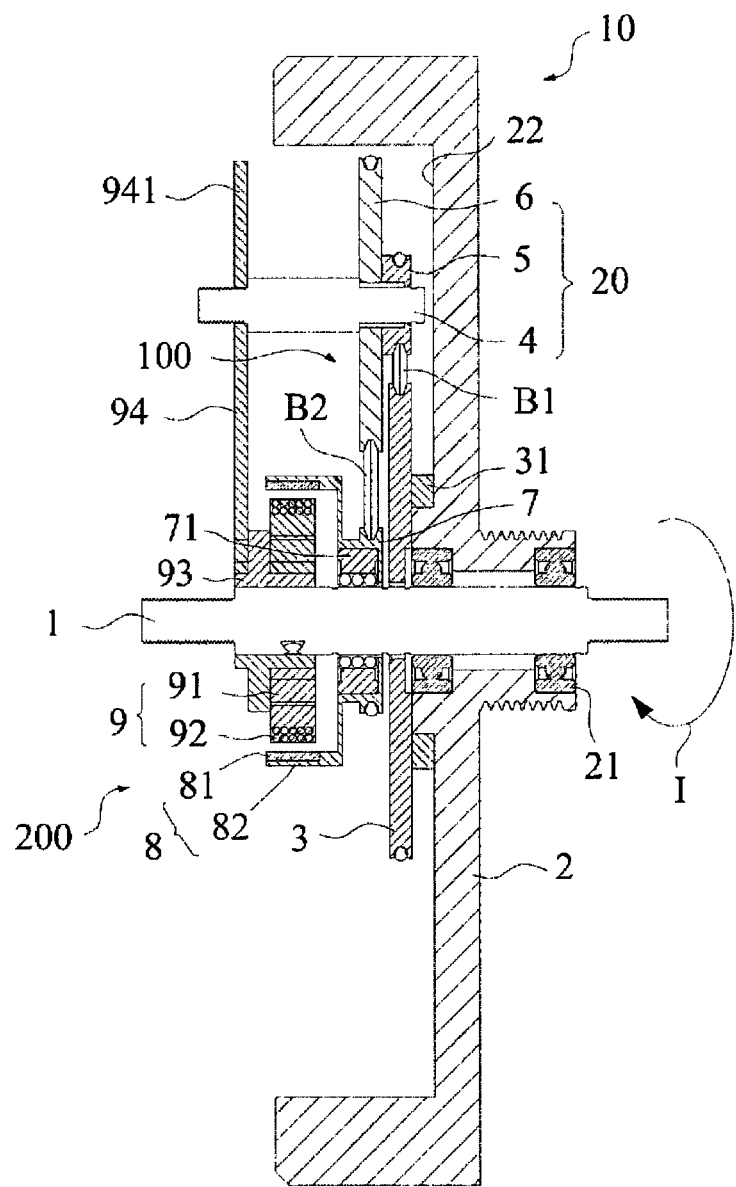
FIG. 3 is a cross-sectional view taken along line 3-3 of FIG. 2.

With reference to the drawings and in particular to FIGS. 1-3, a rotary disk acceleration device, generally designated at 10, according to a first embodiment of the present invention is provided for exercise equipment, comprising generally a rotary disk acceleration mechanism 100 and a power generation module 200. The rotary disk acceleration mechanism 100 comprises a stationary axle 1 and a flywheel 2. The stationary axle 1 is provided with a flywheel bearing 21, whereby the flywheel 2 is supported by the flywheel bearing 21 to rotatably mount to the stationary axle 1.

A first large rotary disk 3 is rotatably mounted to the stationary axle 1 and is connected by a connection bar 31 to an inside surface 22 of the flywheel 2, whereby when the flywheel 2 is driven by an external driving force I to rotate, the first large rotary disk 3 is caused by the connection bar 31 to rotate in synchronization with the flywheel 2.

The present invention comprises at least one acceleration disk assembly 20, which is composed of a first secondary shaft 4, a first small rotary disk 5, and a second large rotary disk 6. The first secondary shaft 4 is mounted at a position close to the stationary axle 1 and is spaced from the stationary axle 1 by a predetermined distance. A first small rotary disk 5 is rotatably mounted to the first secondary shaft 4. A first belt B1 is coupled between the first small rotary disk 5 and the first large rotary disk 3. The first large rotary disk 3 drives the first small rotary disk 5 to rotate via the first belt B1.

The drawings show an embodiment of the acceleration disk assembly 20 as an example. In practical applications, there can be one or more acceleration disk assemblies 20 depending on the desired amplification.

The second large rotary disk 6 is rotatably mounted to the first secondary shaft 4 and is fixedly attached to the first small rotary disk 5 to be rotatable in synchronization with the first small rotary disk 5.

A second small rotary disk 7 is rotatably mounted by a first bearing 71 to the stationary axle 1 and is coaxial with the first large rotary disk 3. A second belt B2 is coupled between the second large rotary disk 6 and the second small rotary disk 7. The second large rotary disk 6 drives the second small rotary disk 7 to rotate via the second belt B2.

The first large rotary disk 3 has a diameter that is sized to show a diameter ratio of 5:1 with respect to diameter of the first small rotary disk 5, and the second large rotary disk 6 has a diameter that is sized to show a diameter ratio of 5:1 with respect to diameter of the second small rotary disk 7. In this way, an external driving force I drives, via the first large rotary disk 3, the first small rotary disk 5 and the second large rotary disk 6 to rotate and the second large rotary disk 6 in turn drives the second small rotary disk 7 to rotate, whereby rotational speed caused by the external driving force I is amplified by 25 times.

In respect of the power generation module 200, the power generation module 200 comprises a plurality of circumferentially extending magnet elements 81, and the magnet elements 81 are circumferentially set around an inner circumferential surface of a carrier 82 that is driven by the second small rotary disk 7 to rotate to serve as a rotor 8 of the power generation module 200.

At a location corresponding to the carrier 82 and the circumferentially-extending magnet elements 81, a stator 9 is mounted. The stator 9 comprises a coil core 91 and coils 92. The coil core 91 is formed by stacking a plurality of silicon steel plates around which a plurality of coils 92 is wound so that each of the coils 92 opposes the magnet elements 81 with a predetermined gap kept therebetween. When the second small rotary disk 7 rotates at a high speed, the carrier 82 and the magnet elements 81 rotate in unison therewith, causing the coils 92 to generate electrical power.

In the instant embodiment, the coil core 91 is mounted by a retention seat 93 to the stationary axle 1. The retention seat 93 comprises a support frame 94 fixed thereto. The support frame 94 has a free end 941 extending from the stationary axle 1 by a predetermined length and the free end 941 is coupled to an end of the first secondary shaft 4 to position the first secondary shaft 4 close to the stationary axle 1.

Figure 5:
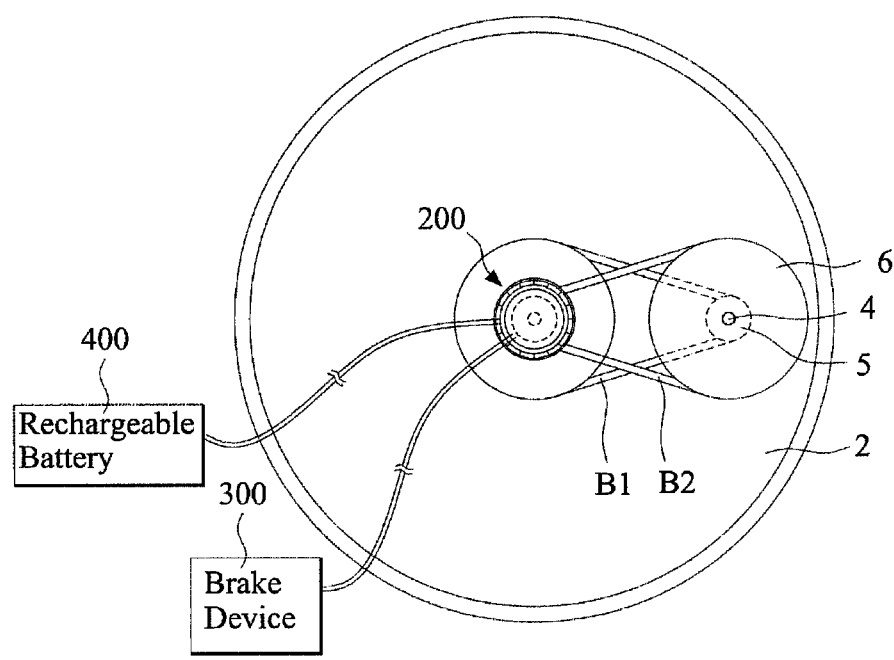
FIG. 5 is a schematic view showing a power generation module of the first embodiment of the present invention coupled to a brake device.

Referring to FIG. 5, a schematic view illustrating the power generation module 200 of FIG. 3 is further coupled with a brake device 300. The electrical power generated by the power generation module 200 is supplied to the brake device 300 to cause the brake device 300 to generate a braking power, and this allows the brake device 300 to be mounted to various exercise equipment to provide a braking power that is desired when the exercise equipment is operated by a user. The power generation module 200 may also be coupled to a rechargeable battery 400. The rechargeable battery 400 may further electrically connect to a power converter to supply a proper electrical power to electrical equipments such as electric fan.

Figure 4:
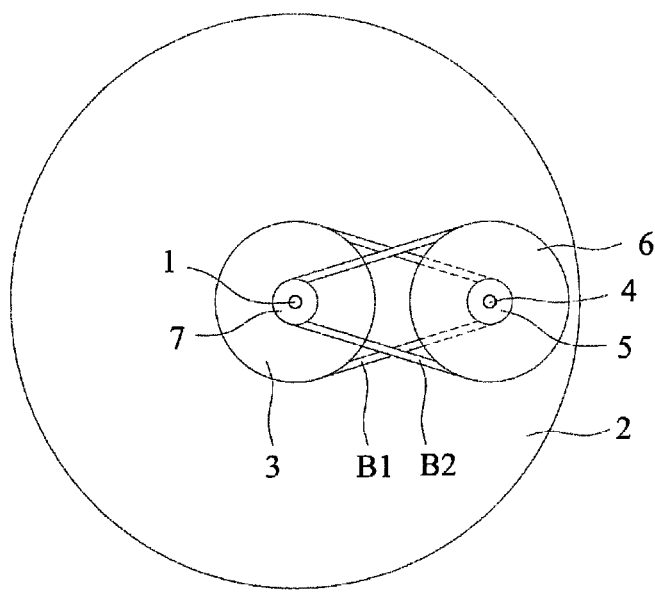
FIG. 4 is a top plan view showing a second small rotary disk and a first large rotary disk of the first embodiment of the present invention are arranged coaxial with each other.

In the present invention, the second small rotary disk 7 is rotatably mounted by the first bearing 71 to the stationary axle 1, and is coaxial with the first large rotary disk 3. A schematic view showing an equivalent structure is given in FIG. 4.

The electrical power generated by the power generation module 200 according to the present invention can be of various applications. For example, as shown in FIG. 5, when the present invention is applied to a stationary bike, the electrical power generated by the power generation module 200 is transmitted via electrical wires to a brake device 300 to provide a desired braking power when the stationary bike is operated by a user.

Figure 6:
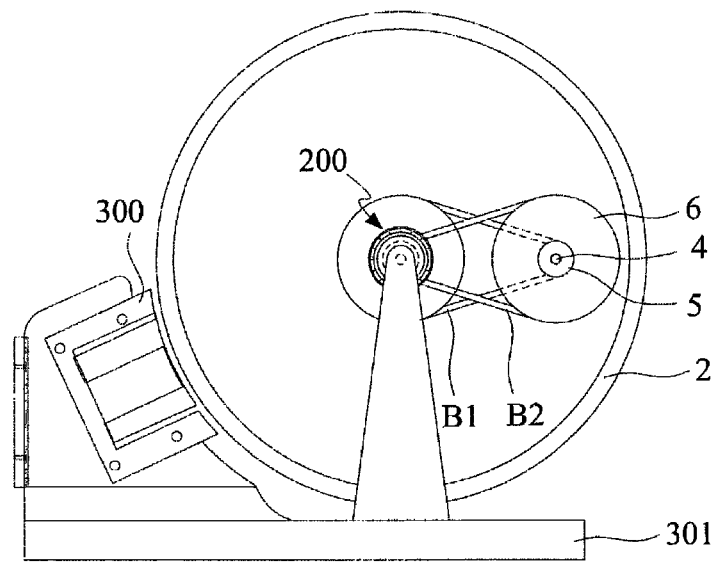
FIG. 6 is a schematic view showing an application of the present invention.

Referring to FIG. 6, with the present invention being mounted to an indoor stationary bike, when the flywheel 2 of the stationary bike is in rotation, through the rotary disk acceleration structure according to the present invention that mounted inside the flywheel 2, the power generation module 200 of the stationary bike is caused to generate electrical power, which electrical power is supplied to the brake device 300 to allow the brake device 300 to generate an electromagnetic braking power with respect to the flywheel 2. The brake device 300 can be set by a simple fixing frame 301 at a position close to and corresponding to an outer circumference of the flywheel 2 of the stationary bike. The outer rim of the flywheel 2 can be provided with an aluminum or copper ring.

Figure 7:
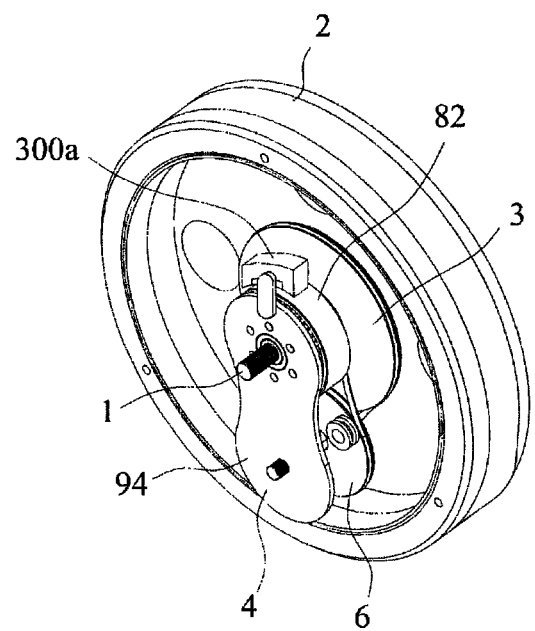
FIG. 7 is a schematic view showing an application of the present invention.

Referring to FIG. 7, an arrangement similar to FIG. 6 is shown, in which a brake device 300a is mounted by a support frame 94 at a location corresponding to an outer circumference of a carrier 82. The electrical power generated by power generation module 200 is supplied to the brake device 300a to allow the brake device 300a to generate an electromagnetic braking power with respect to the carrier 82 thereby providing a braking power to the flywheel 2. Since the carrier 82 is rotated at a high speed with the second small rotary disk 7, the brake device 300a can provide an excellent result of electromagnetic braking to the carrier 82.

Figure 8:
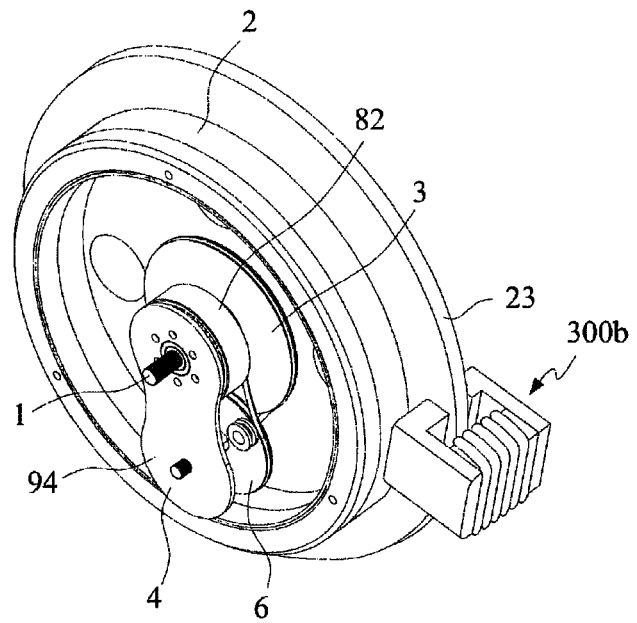
FIG. 8 is a schematic view showing an application of the present invention.

Referring to FIG. 8, when the present invention is mounted to a stationary bike and the stationary bike has a flywheel 2 that is provided with a flywheel flange 23 made of aluminum or copper, as shown in the drawing, the brake device 300b can be arranged by two sides of the flywheel flange 23 of the flywheel 2. The power generation module 200 generates electrical power that is supplied to the brake device 300b to allow the brake device 300b to generate an electromagnetic braking power to the flywheel flange 23 of the flywheel 2 and thus providing a braking power to the flywheel 2. In this embodiment, the flywheel 2 can be made in a reduced diameter to save material. Further, in the embodiment, the flywheel flange 23 can be integrated with a flywheel 2 of exercise equipment, or alternatively, the flywheel 2 is omitted and only the flywheel flange 23 made of aluminum or copper is used in combination with the power generation module 200 and the brake device 300b to achieve the result of braking.

Figure 9:
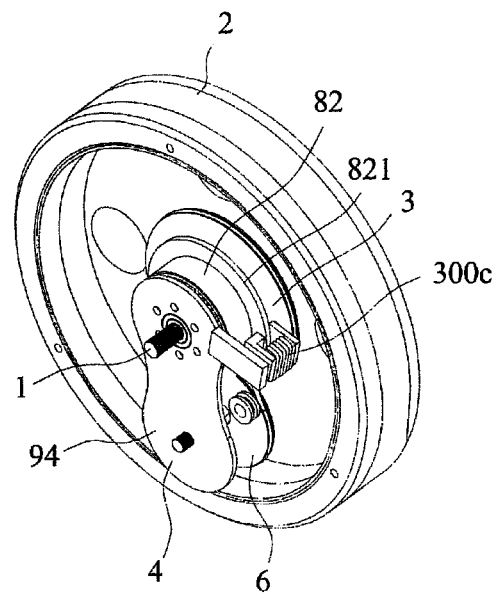
FIG. 9 is a schematic view showing an application of the present invention.

Referring to FIG. 9, an arrangement similar to FIG. 7 is shown, in which a brake device 300c is fixed by a support frame 94 at a location corresponding to two sides of an aluminum- or copper-made carrier flange 821 of a carrier 82. The electrical power generated by the power generation module 200 is supplied to the brake device 300c to allow the brake device 300c to generate an electromagnetic braking power with respect to the carrier flange 821 thereby providing a braking power to the flywheel 2. In this embodiment, the carrier flange 821 can be integrated to a flywheel 2 of exercise equipment, or alternatively, the flywheel 2 is omitted and only the aluminum- or copper-made carrier flange 821 is used in combination with the power generation module 200 and the brake device 300c to achieve the result of braking.

Figure 10:
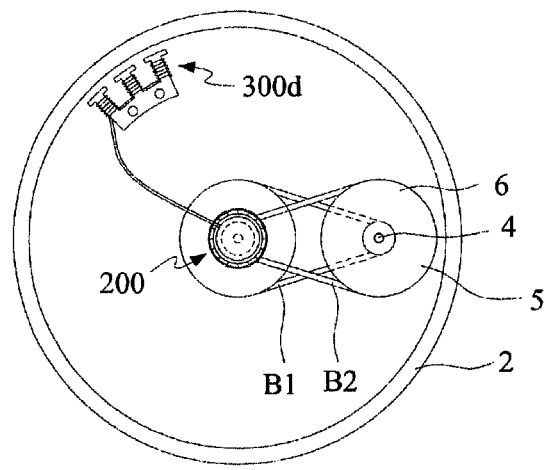
FIG. 10 is a schematic view showing an application of the present invention.

Referring to FIG. 10, the present invention can be put into practice by arranging a brake device 300d at an inner circumference of a flywheel 2. A power generation module 200 generates electrical power that is supplied to the brake device 300d to allow the brake device 300d to generate electromagnetic braking power with respect to the flywheel 2.

Figure 11:
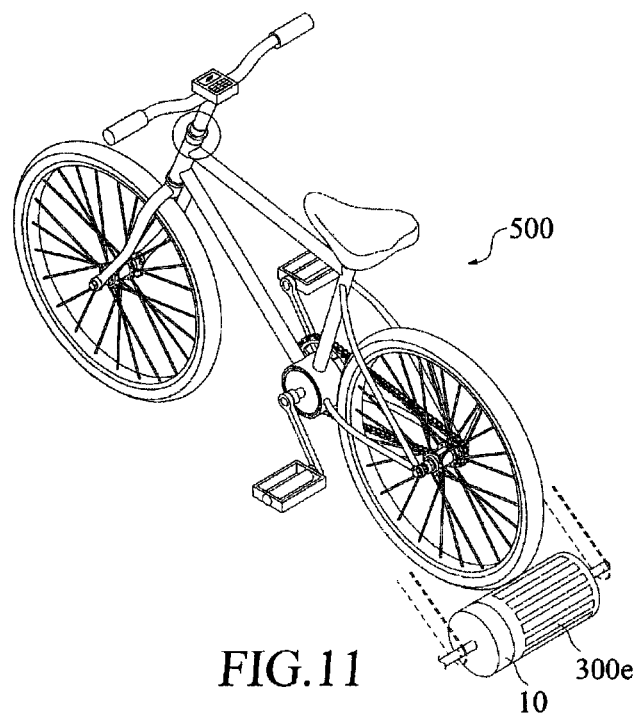
FIG. 11 is a schematic view showing an application of the present invention.

Referring to FIG. 11, exercise equipment 500 according to the present invention can be a bicycle training device, and a rotary disk acceleration device 10 for exercise equipment according to the present invention (which comprises a rotary disk acceleration mechanism and a power generation module) is arranged rearward of a rear wheel of the bicycle training device and is coupled to a braking roller 300e. When a user pedals the bicycle training device, the rotary disk acceleration device 10 for exercise equipment according to the present invention is caused to operate and the power generation module generates electrical power that is supplied to braking roller 300e to allow the braking roller 300e to generate a braking power to the rear wheel of the bicycle training device.

Figure 12:
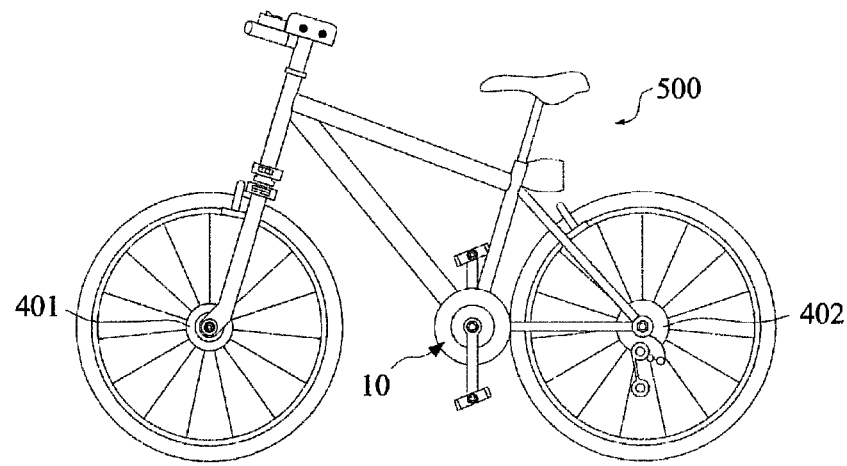
FIG. 12 is a schematic view showing an application of the present invention.

Referring to FIG. 12, when the present invention is applied to a bicycle, the rotary disk acceleration device 10 for exercise equipment according to the present invention (which comprises a rotary disk acceleration mechanism and a power generation module) is mounted to a pedal axle, front wheel hub 401, or rear wheel hub 402 of the bicycle. When a user pedals the bicycle, the rotary disk acceleration device for exercise equipment according to the present invention is caused to rotate and the power generation module 200 generates electrical power that is supplied to a load.

Figure 13:
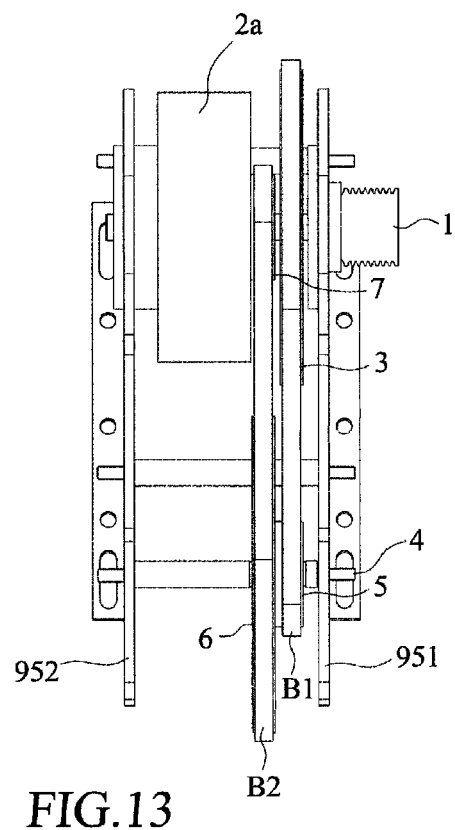
FIG. 13 shows a second embodiment of the present invention.

In the embodiments discussed above, the flywheel 2 has a large diameter and it is also possible to use a flywheel of a relatively small diameter. As shown in FIG. 13, a second embodiment of the present invention comprises a stationary axle 1, a flywheel 2a, a first large rotary disk 3, a first secondary shaft 4, a first small rotary disk 5, a second large rotary disk 6, and a second small rotary disk 7, a first belt B1, a second belt B2. All these components are supported between a pair of side supporting plates 951, 952, in which the flywheel 2a is mounted on a side of the first large rotary disk 3, the second large rotary disk 6, the second belt B2, and the second small rotary disk 7.

Figure 14:
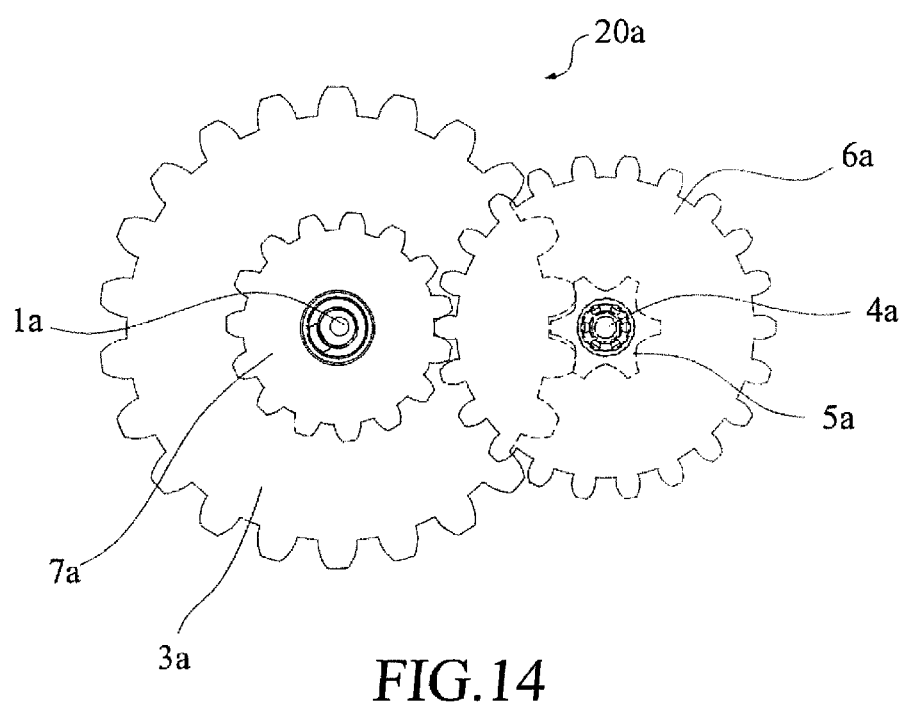
FIG. 14 shows a third embodiment of the present invention.

Further, in the previously discussed embodiments, a rotary disk is taken as an example for illustration, but the present invention is also applicable to assembly components of toothed wheels. In this embodiment, the operation principle and application are substantially identical to those of the previous embodiments. As shown in FIG. 14, an acceleration disk assembly 20 according to a third embodiment of the present invention comprises a stationary axle 1a, a first large rotary disk 3a, a first secondary shaft 4a, a first small rotary disk 5a, a second large rotary disk 6a, and a second small rotary disk 7a. The first large rotary disk 3a, the first small rotary disk 5a, the second large rotary disk 6a, and the second small rotary disk 7a are all toothed wheel like rotary disk.

The first small rotary disk 5a is rotatably mounted to the first secondary shaft 4a and mates the first large rotary disk 3a. When the first large rotary disk 3a rotates, it drives the first small rotary disk 5a to rotate. The second large rotary disk 6a is rotatably mounted to the first secondary shaft 4a and is fixedly connected to the first small rotary disk 5a. When the first small rotary disk 5a rotates, it drives the second large rotary disk 6a to rotate in synchronization therewith. The second small rotary disk 7a is rotatably mounted to the stationary axle 1a and is coaxial with the first large rotary disk 3a. The second small rotary disk 7a mates the second large rotary disk 6a. When the second large rotary disk 6a rotates, it drives the second small rotary disk 7a to rotate.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An acceleration mechanism for an exercise equipment, comprising:
    a stationary axle;
    a first large rotary disk rotatably mounted to the stationary axle and adapted to be driven by an external driving force to rotate;
    at least one acceleration disk assembly coupled to the first large rotary disk and adapted to be driven by the first large rotary disk to rotate;
    a first bearing mounted to the stationary axle;
    a second small rotary disk rotatably mounted by the first bearing to the stationary axle and is coaxial with the first large rotary disk, the second small rotary disk being driven by the acceleration disk assembly to rotate;
    a flywheel coupled to the second small rotary disk and rotatably mounted to the stationary axle, the flywheel being driven by the second small rotary disk to rotate; and
    a power generation module, comprising:
        a carrier coupled to the second small rotary disk, the carrier being driven by the second small rotary disk to rotate;
        a rotor that includes a plurality of circumferentially extending magnet elements, the magnet elements being circumferentially arranged at an inner circumference of the carrier; and
        a stator that includes a coil core and a plurality of coils wound around the coil core, each of the coils corresponding to the magnet elements with a predetermined gap existing therebetween.

2. The rotary disk acceleration device as claimed in claim 1, wherein the acceleration disk assembly comprises:
    a shaft mounted at a position close to the stationary axle and spaced from the stationary axle by a predetermined distance;
    a first small rotary disk rotatably mounted to the shaft; and
    a second large rotary disk rotatably mounted to the shaft and fixedly attached to the first small rotary disk to be rotatable in unison with the first small rotary disk.

3. The rotary disk acceleration device as claimed in claim 2, wherein the stationary axle comprises a support frame fixed thereto, the support frame having a free end that extends from the stationary axle by a predetermined length, the free end being coupled to the shaft in order to have the shaft mounted at a position close to the stationary axle.

4. The rotary disk acceleration device as claimed in claim 1, wherein the power generation module is coupled to a brake device, an electrical power generated by the power generation module being supplied to the brake device.

5. The rotary disk acceleration device as claimed in claim 1, wherein the power generation module is connected to a rechargeable battery.

6. The rotary disk acceleration device as claimed in claim 1, further comprising:
    a first belt coupled between the acceleration disk assembly and the first large rotary disk, the first large rotary disk driving, via the first belt, the acceleration disk assembly to rotate; and
    a second belt coupled between the acceleration disk assembly and the second small rotary disk the acceleration disk assembly driving, via the second belt, the second small rotary disk to rotate.

7. The rotary disk acceleration device as claimed in claim 1, wherein the stationary axle, the first large rotary disk, the acceleration disk assembly, the first bearing, the second small rotary disk, and the flywheel are supported between a pair of side supporting plates.

\* \* \* \* \*